(12) United States Patent
Izumi (10) Patent No.: US 10,214,352 B2
(45) Date of Patent: Feb. 26, 2019

(54) CARRIER SYSTEM AND METHOD FOR CONTROLLING CARRIER SYSTEM

(71) Applicant: Murata Machinery, Ltd., Kyoto-shi, Kyoto (JP)

(72) Inventor: Satoru Izumi, Aichi (JP)

(73) Assignee: Murata Machinery, Ltd. (JP)

(*) Notice: Subject to any disclaimer, the term of this patent is extended or adjusted under 35 U.S.C. 154(b) by 493 days.

(21) Appl. No.: 14/830,226

(22) Filed: Aug. 19, 2015

(65) Prior Publication Data
US 2016/0060033 A1    Mar. 3, 2016

(30) Foreign Application Priority Data

Sep. 1, 2014    (JP) .................................. 2014-177028

(51) Int. Cl.
*B65G 1/04*    (2006.01)
(52) U.S. Cl.
CPC ................................. *B65G 1/0464* (2013.01)
(58) Field of Classification Search
CPC .................................................... B65G 1/0457
USPC ........................................................ 414/282
See application file for complete search history.

(56) References Cited

U.S. PATENT DOCUMENTS

| | | | | |
|---|---|---|---|---|
| 4,252,488 A | * | 2/1981 | Kochanneck | A47B 49/008 312/202 |
| 8,554,643 B2 | * | 10/2013 | Kortelainen | B65G 1/0435 414/277 |
| 9,845,208 B2 | * | 12/2017 | Lindbo | B65G 57/303 |

FOREIGN PATENT DOCUMENTS

| | | |
|---|---|---|
| JP | 63-037010 A | 2/1988 |
| JP | 63-242809 A | 10/1988 |
| JP | 05-186005 A | 7/1993 |

OTHER PUBLICATIONS

JP 63-242809 (Jul. 10, 1998) English machine translation. Retrieved Jan. 8, 2018. Retrieved from Espacenet (https://worldwide.espacenet.com/advancedSearch?locale=en_EP).*

* cited by examiner

*Primary Examiner* — Jonathan Snelting
(74) *Attorney, Agent, or Firm* — DLA Piper LLP (US)

(57) ABSTRACT

A carrier system capable of rapidly carrying a cargo includes: a circulation rail which is hung from above and includes a curved part; a plurality of carriers, each of which includes a travelling vehicle that travels along the circulation rail and a lift stage that is liftably hung on the travelling vehicle and serves to hold a cargo, and each of which lifts and lowers the lift stage while traveling along the circulation rail; a plurality of racks which are arranged in parallel along the circulation rail, and each of which includes a plurality of placement parts arranged in parallel in a vertical direction; and a controller which selects any of the plurality of placement parts as a storing position of the cargo and instructs the carrier that holds the cargo out of the plurality of carriers, about the storing position.

5 Claims, 10 Drawing Sheets

CARRIER SYSTEM AND METHOD FOR CONTROLLING CARRIER SYSTEM

CROSS-REFERENCE TO RELATED APPLICATIONS

This application claims the benefit of priority under 35 USC 120 of Japanese application no. 2014-177028, filed on Sep. 1, 2014, which is incorporated herein by reference.

BACKGROUND OF THE INVENTION

1. Field of the Invention

The present invention relates to a carrier system for carrying a cargo in the vicinity of a ceiling to transfer the cargo to a rack or the like, and a method for controlling the same.

2. Description of the Related Art

There has hitherto been known a carrier system for making a carrier travel along a rail hung on a ceiling to carry a cargo in the vicinity of the ceiling. The carrier used for this carrier system includes a travelling vehicle that travels along the rail, and a lift stage liftably hung on the travelling vehicle by means of a hanging member having flexibility. For example, when storing cargo in a rack arranged along the rail, the carrier moves along the rail to a position of the rack, and the lift stage is lowered to a height of a placement part for storing the cargo in the rack, and thereafter, the cargo is stored on the placement part.

In a carrier system described in Unexamined Japanese Patent Publication No. 63-242809, a plurality of carriers are made to travel along a circulation rail so as to rapidly carry a large number of cargoes.

However, in the carrier system described in Unexamined Japanese Patent Publication No. 63-242809, since the carrier stops while being hung on the circulation rail while a cargo is transferred between the carrier and a rack, travelling of another carrier that travels along the rail may be disturbed. Hence rapid carriage of a cargo by the other carrier may be prevented.

BRIEF SUMMARY OF THE INVENTION

In view of the above conventional problem, an object of the present invention is to provide a carrier system capable of rapidly carrying a cargo, and a method for controlling the same.

In order to achieve the above object, a carrier system according to one aspect of the present invention includes: a circulation rail which is hung from above and includes a curved part; a plurality of carriers, each of which includes a travelling vehicle that travels along the circulation rail and a lift stage that is liftably hung on the travelling vehicle and configured to hold a cargo, and each of which lifts and lowers the lift stage while traveling along the circulation rail; a plurality of racks which are arranged in parallel along the circulation rail, and each of which includes a plurality of placement parts arranged in parallel in a vertical direction; and a controller which selects any of the plurality of placement parts as a storing position of the cargo and instructs the carrier that holds the cargo out of the plurality of carriers, about the storing position.

With this configuration, the carrier can lift or lower the lift stage while travelling, and hence the time for stopping to store the cargo can be made shorter than that in the case of not lifting or lowering the lift stage while travelling. This can reduce disturbance of travelling of another carrier when the carrier is at a stop to store the cargo. Accordingly, with this configuration, it is possible to rapidly carry a large number of cargoes. Further, in the carrier system according to the present embodiment, the use of the circulation rail including the curved part can lead to more improvement in layout flexibility than in a carrier system using a linear rail.

Further, in a carrier system according to one aspect of the present invention, each of the plurality of racks may include an end part that is a portion within a predetermined distance from the curved part, and a central part other than the end part, the end part may include a lower region located at a lower portion of the end part and an upper region located above the lower region, and when storing the cargo in the plurality of racks, the controller may select, as the storing position, the placement part arranged in a region other than the lower region in preference to the placement part arranged in the lower region, out of the plurality of placement parts.

With this configuration, the cargo is preferentially stored on the placement part other than the placement part arranged in the lower region being in the end part of the rack. Here, there is assumed a case in which, when the carrier passes through the curved part of the circulation rail, the carrier travels with a lowering amount of the lift stage being zero, in order to suppress swinging of the lift stage due to centrifugal force. In this case, for example, when storing the cargo on the placement part arranged in the lower region of the end part of the rack in the vicinity of the curved part of the circulation rail, the rack being arranged in front of the curved part, the carrier may not be able to lower the lift stage to the placement part only by lowering the lift stage while travelling. Then, when the carrier cannot lower the lift stage to the placement part while travelling, it is necessary, for example, for the carrier to lower the lift stage even after stopping, or to go slow. Hence the longer time is required in this case than in the case where the carrier stores the cargo on the placement part located in the upper region. Further, when the carrier starts travelling after storing the cargo on the placement part arranged in the lower region of the end part of the rack in the vicinity of the curved part of the circulation rail, the rack being arranged in front of the curved part, even if the carrier lifts the lift stage while travelling, the lowering amount of the lift stage cannot be made zero before the carrier reaches the curved part. Then, when the lowering amount of the lift stage cannot be made zero before the carrier reaches the curved part, for example, it is necessary for the carrier to temporarily stop before reaching the curved part, or to go slow and lift the lift stage. Hence the longer time is required in this case than in the case where the carrier stores the cargo on the placement part located in the upper region. On the other hand, with the above configuration, the possibility of making the carrier stop or go slow only for lifting or lowering the lift stage is reduced, thereby allowing suppression of the time required for storing the cargo.

Further, in a carrier system according to one aspect of the present invention, the controller may acquire a storing/delivery frequency showing a frequency of storing and delivering the cargo with respect to each of the cargoes, and may select the placement part arranged in the lower region as the storing position of the cargo with the storing/delivery frequency lower than a predetermined frequency.

With this configuration, the possibility that the cargo with a high storing/delivery frequency is stored on the placement part in the lower region of the end part of the rack is reduced. This reduces frequent storing and delivery of the cargo with a high storing/delivery frequency which has been stored on the placement part in the lower region, and stopping of the carrier for a long time in each storing/delivery.

Further, in a carrier system according to one aspect of the present invention, the carrier may pass through the curved part at a first speed when a lowering amount of the lift stage is a first lowering amount, and the carrier may pass through the curved part at a second speed which is lower than the first speed when the lowering amount of the lift stage is a second lowering amount which is larger than the first lowering amount.

With this configuration, it is possible to suppress a width of swinging of the lift stage due to centrifugal force in the case where the carrier travels in the curved part of the circulation rail.

Further, in a carrier system according to one aspect of the present invention, at least one of the controller and the carrier may further include a decision part which decides a lowering amount of the lift stage at a time when the carrier passes through the curved part, based on the storing position, and on the position of the carrier and the lowering amount of the lift stage when the storing position is instructed by the controller.

With this configuration, the decision part can appropriately decide the lowering amount of the lift stage at the time when the carrier passes through the curved part in accordance with the storing position of the cargo, and the like. For example, the decision part can decide the lowering amount of the lift stage such that the carrier can move to the storing position in the minimum time. Further, the decision part can decide the speed of the carrier at the time when the carrier passes through the curved part in accordance with that lowering amount.

Further, a method for controlling a carrier system according to one aspect of the present invention is a method for controlling a carrier system including a circulation rail which is hung from above and includes a curved part, a plurality of carriers, each of which includes a travelling vehicle that travels along the circulation rail and a lift stage that is liftably hung on the travelling vehicle and configured to hold a cargo, and a plurality of racks which are arranged in parallel along the circulation rail, and each of which includes a plurality of placement parts arranged in parallel in a vertical direction, and the method includes the steps of: selecting any of the plurality of placement parts as a storing position of the cargo; instructing the carrier that holds the cargo out of the plurality of carriers, about the storing position; and making each of the plurality of carriers lift or lower the lift stage while travelling along the circulation rail.

With this method, the carrier can lift or lower the lift stage while travelling, and hence the time for stopping to store the cargo can be made shorter than that in the case of not lifting or lowering the lift stage while travelling. This can reduce disturbance of travelling of another carrier when the carrier is at a stop to store the cargo. Accordingly, with this configuration, it is possible to rapidly carry a large number of cargoes.

In addition, it is also possible to realize each piece of processing included in the method for controlling the carrier system as a program to be executed by a computer, and to realize each piece of processing as a recording medium recorded with that program. It is then possible to distribute the program via a transmission medium such as the Internet or a recording medium such as a DVD.

According to the present invention, it is possible to provide a carrier system capable of rapidly carrying a cargo, and a method for controlling the same

DETAILED DESCRIPTION

Hereinafter, carrier systems of embodiments of the present invention will be described with reference to the drawings. It is to be noted that each of the drawings is a schematic drawing, and is not necessarily illustrated in a precise manner.

Further, embodiments described below show comprehensive or specific examples. Numerical values, shapes, materials, constituents, arranged positions and a connection configuration of the constituents, steps, a sequence of the steps, and the like shown in the following embodiments are examples, and not intended to restrict the present invention.

First Embodiment 1-1. Whole Configuration of Carrier System

First, a whole configuration of a carrier system according to the first embodiment will be described with reference to FIGS. 1 and 2.

Figure 1:
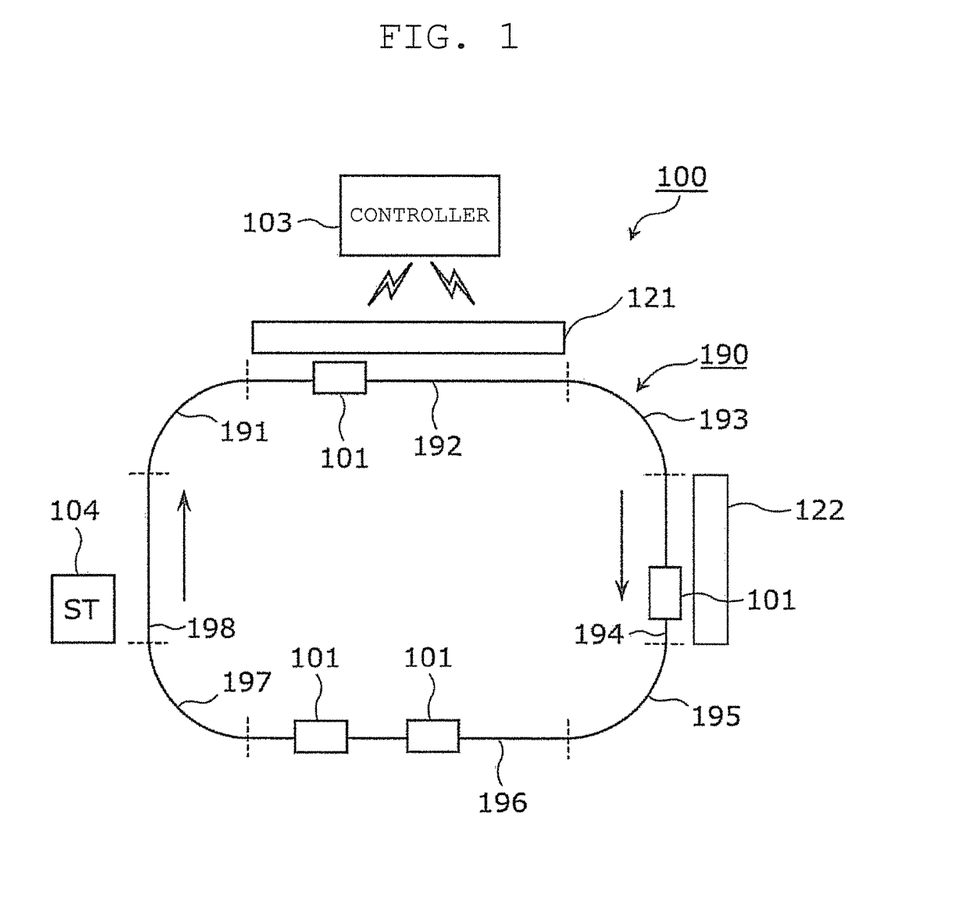
FIG. 1 is a plan view illustrating a configuration outline for a carrier system according to a first embodiment.

FIG. 1 is a plan view illustrating a configuration outline for a carrier system according to the present embodiment.

Figure 2:
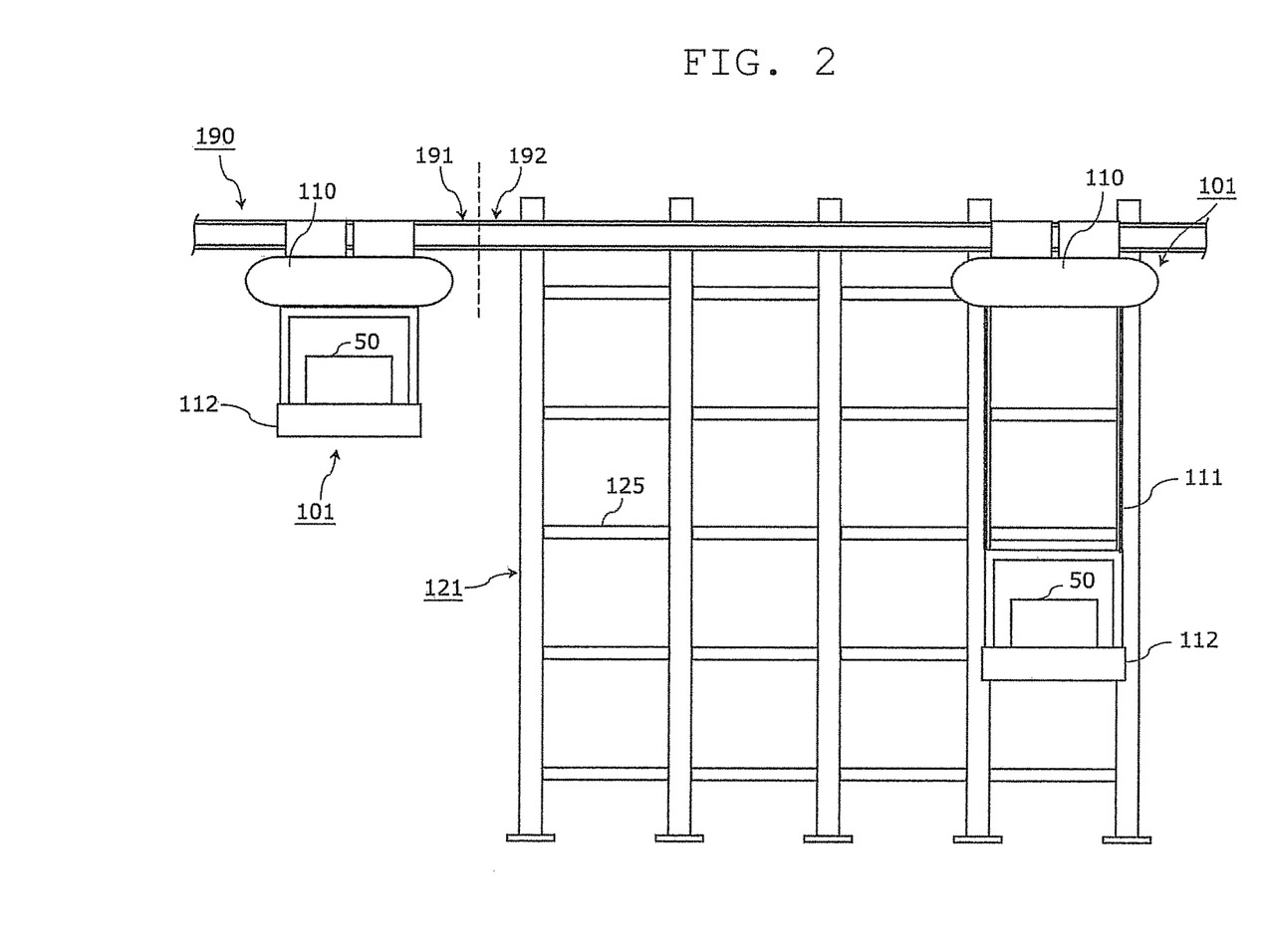
FIG. 2 is a front view illustrating a configuration outline for a carrier and a rack according to the first embodiment.

FIG. 2 is a front view illustrating a configuration outline for a carrier and a rack according to the present embodiment.

As illustrated in FIG. 1, a carrier system 100 according to the present embodiment includes a circulation rail 190, a plurality of carriers 101 that travel along the circulation rail 190, and a controller 103 that controls an operation of the carrier 101. Further, racks 121 and 122 and a station 104 are provided in positions along the circulation rail 190.

The circulation rail 190 is a structure hung from above and including a curved part. The circulation rail 190 guides travelling of the carrier 101 and forms a travelling route of the carrier 101. In the present embodiment, the circulation rail 190 is arranged while being hung from a ceiling located above the carrier system 100. Further, the circulation rail 190 includes curved parts 191, 193, 195 and 197 that are portions having curvatures, and linear parts 192, 194, 196 and 198 that are linear portions.

Although a layout of the circulation rail 190 is represented in a simple shape in FIG. 1, this is one example of the layout of the circulation rail 190. As the layout of the circulation rail 190, a complicated shape can be employed in accordance with a factory building and arrangement of productive installation, to which the carrier system 100 is applied. Further, the circulation rail 190 may be configured to include a branch part and share apart of another route.

As illustrated in FIGS. 1 and 2, the racks 121 and 122 are installations including a plurality of placement parts 125 that are arrayed in a vertical direction (perpendicular direction of FIG. 2) and serve for placement of the cargo 50. In the present embodiment, a plurality of placement parts 125 are also arranged in a direction along the circulation rail 190. Further, in the present embodiment, the two racks 121 and 122 are arranged in the direction along the circulation rail 190.

The station 104 is an installation for transferring the cargo 50 to and from the carrier 101, and provided in the position along the circulation rail 190. Although FIG. 1 illustrates the configuration where only one station 104 is provided, a configuration where a plurality of them are provided may be adopted.

The controller 103 is a device that communicates with each of the carriers 101 provided in the carrier system 100, to perform control. When storing the cargo 50 in the rack 121 or 122, the controller 103 selects any of the plurality of placement parts 125 as a storing position of the cargo 50, and instructs the carrier 101 holding the cargo 50 about the storing position. It is to be noted that in the present embodiment, information is exchanged with each of the carriers 101 by wireless communication.

As illustrated in FIG. 2, the carrier 101 is a vehicle including a travelling vehicle 110, a hanging member 111 and a lift stage 112, and lifts or lowers the lift stage 112 while travelling along the circulation rail 190.

The hanging member 111 is a member hung from the travelling vehicle 110. By connecting between the travelling vehicle 110 and the lift stage 112, the hanging member 111 hangs the lift stage 112 on the travelling vehicle 110. The hanging member 111 is a member having flexibility to such an extent as to be reelable and it is, for example, a metal wire or chain. In the present embodiment, the lift stage 112 is hung by use of four hanging members 111.

The travelling vehicle 110 is a cart that travels along the circulation rail 190 while being hung on the circulation rail 190. In the present embodiment, the travelling vehicle 110 travels by driving a motor with a mounted battery or electric power that is fed via a power feeder wired along the circulation rail 190. Further, the travelling vehicle 110 includes a motor capable of reeling the hanging member 111, and can reel or send out the hanging member 111, to lift or lower the lift stage 112 hung by the hanging member 111.

The lift stage 112 is a stage that is liftably hung by the hanging member 111 on the travelling vehicle 110 and configured to hold the cargo 50. The lift stage 112 is carried while being placed with the cargo 50 as an object to be carried, and transferred (namely stored and delivered) between the racks 121 and 122, or the like. For example, when transferring the cargo 50 to and from the placement part 125 in the lower portion of the rack 121, as the right-hand carrier 101 illustrated in FIG. 2, the lift stage 112 transfers the cargo 50 while being lowered from the travelling vehicle 110 to a height of the placement part 125 in the lower portion. In the present embodiment, the lift stage 112 includes a transfer device (not illustrated), and extracts and retracts the transfer device to and from the placement part 125, whereby the cargo 50 can be transferred between the lift stage 112 and the placement part 125.

As described above, in the carrier 101, the travelling vehicle 110 travels along the circulation rail 190 and the lift stage 112 is lifted to or lowered from the travelling vehicle 110. It is thereby possible to move the lift stage 112 to the position of any of the placement parts 125 in the racks 121 and 122 provided along the travelling direction of the carrier 101, so as to transfer the cargo 50 to and from any of the placement parts 125.

1-2. Functional Configuration of Controller

Next, a functional configuration of the controller 103 according to the present embodiment will be described with reference to FIG. 3.

Figure 3:
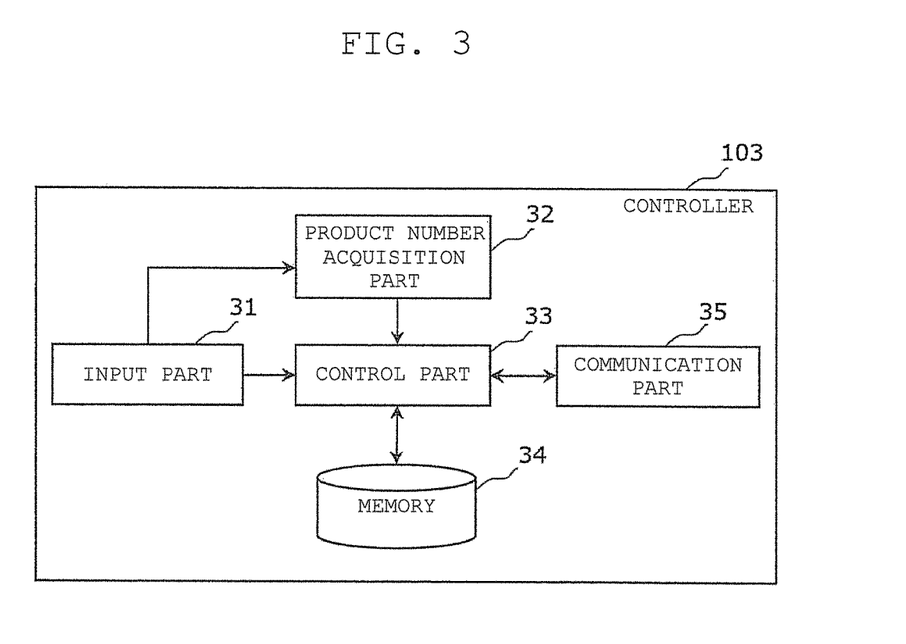
FIG. 3 is a block diagram illustrating a functional configuration of a controller according to the first embodiment.

FIG. 3 is a block diagram illustrating the functional configuration of the controller 103 according to the present embodiment.

As illustrated in FIG. 3, the controller 103 functionally includes an input part 31, a product number acquisition part 32, a control part 33, a memory 34, and a communication part 35.

The input part 31 is an input device that accepts from a user an instruction concerning carriage of the cargo 50. For example, the user can give an instruction about storing of the cargo 50 in the rack 121 or 122 by use of the input part 31 in the station 104. Further, the user can specify a product number or the like of the cargo 50 placed in the rack 121 or the like by use of the input part 31, to give an instruction about delivery to the station 104.

The product number acquisition part 32 is an information acquisition part for acquiring a product number for identifying the cargo 50. For example, the cargo 50 has a product number as a number of a product kept on the inside thereof. The product number acquisition part 32 can acquire information of the product number written on the cargo 50. Further, the product number acquisition part 32 can also acquire from the input part 31 a product number inputted into the input part 31.

The control part 33 is a processing part that decides an instruction concerning storing and delivery of the cargo 50 to the carrier 101. The control part 33 transmits to carrier 101 a signal showing contents of the decided instruction to the carrier 101 by means of the communication part 35. It is to be noted that the control part 33 may be configured only by hardware, or may be realized by combining hardware and software. The control part 33 can also be realized by a microcomputer or the like, for example.

The memory 34 is a memory that stores information of the configuration of the carrier system 100 and the cargo 50 stored on each of the placement parts 125 in the racks 121 and 122.

The communication part 35 is a transmission/reception device that transmits a signal to the carrier 101 and receives a signal from the carrier 101 to the controller 103. In the present embodiment, the communication part 35 exchanges information with the carrier 101 by wireless communication.

1-3. Functional Configuration of Carrier

Next, a functional configuration of the carrier 101 according to the present embodiment will be described with reference to FIG. 4.

Figure 4:
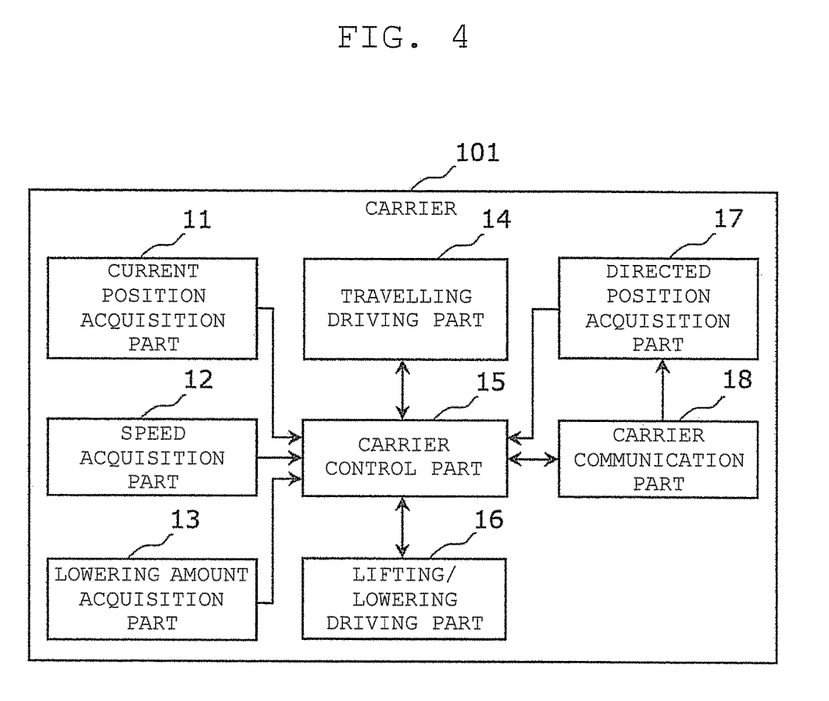
FIG. 4 is a block diagram illustrating a functional configuration of the carrier according to the first embodiment.

FIG. 4 is a block diagram illustrating the functional configuration of the carrier 101 according to the present embodiment.

As illustrated in FIG. 4, the carrier 101 functionally includes a current position acquisition part 11, a speed acquisition part 12, a lowering amount acquisition part 13, a travelling driving part 14, a carrier control part 15, a lifting/lowering driving part 16, a directed position acquisition part 17, and a carrier communication part 18.

The current position acquisition part 11 is an information acquisition part that detects current position information (information of a position along the circulation rail 190) of the vehicle, and outputs a signal showing the acquired position information to the carrier control part 15. The current position acquisition part 11 reads a barcode that includes position information written on the circulation rail 190, thereby acquiring the position information along the circulation rail 190. It is to be noted that the current position acquisition part 11 may acquire position information by some other arbitrary method.

The speed acquisition part 12 is an information acquisition part that acquires speed information of the vehicle, and outputs a signal showing the acquired speed information to the carrier control part 15. The speed acquisition part 12 can acquire speed information of the carrier 101 from the travelling driving part 14. It is to be noted that the speed acquisition part 12 may acquire speed information by some other arbitrary method. For example, the speed acquisition part 12 may calculate speed information from a plurality of pieces of position information acquired by the current position acquisition part 11 and the times at which the respective pieces of position information have been acquired.

The lowering amount acquisition part 13 is an information acquisition part that acquires lowering amount information that is a length where the lift stage 112 lowers from the travelling vehicle 110, and outputs a signal showing the acquired lowering amount to the carrier control part 15. The lowering amount acquisition part 13 can acquire a lowering amount from a length of the hanging member 111 sent out from the travelling vehicle 110. It is noted that the lowering amount acquisition part 13 may acquire lowering amount information by some other arbitrary method.

The travelling driving part 14 is a driving part that drives a motor provided in the travelling vehicle 110 and configured to make the travelling vehicle 110 travel, based on an instruction from the carrier control part 15.

The carrier control part 15 is a processing part for controlling the travelling driving part 14 and the lifting/lowering driving part 16. The carrier control part 15 receives information of a directed position, transmitted from the controller 103, from the directed position acquisition part 17 and controls the travelling driving part 14 and the lifting/lowering driving part 16 so as to move the travelling vehicle 110 and the lift stage 112 to the directed position. At that time, information of the current position and a speed of the own vehicle and a lowering amount of the lift stage 112 are respectively received from the current position acquisition part 11, the speed acquisition part 12 and the lowering amount acquisition part 13. Further, the carrier control part 15 receives information showing a current position of another carrier 101 traveling ahead of the vehicle from the carrier communication part 18. Then, based on that information, the carrier control part 15 controls the travelling driving part 14 so as to prevent contact with another carrier 101 traveling ahead. Specifically, the carrier control part 15 is realized by a processor that executes a program, or the like. It is to be noted that the carrier control part 15 may be configured only of hardware, or may be realized by combining hardware and software. The carrier control part 15 can also be realized by a microcomputer or the like, for example.

The lifting/lowering driving part 16 is a driving part that drives a motor provided in the travelling vehicle 110 and is configured to lift or lower the lift stage 112, based on an instruction from the carrier control part 15.

The directed position acquisition part 17 is an information acquisition part that acquires a directed position which is a target position of the carrier 101 and the lift stage 112 and has been instructed by the controller 103. Information of the directed position is included in a signal transmitted from the controller 103 to the carrier communication part 18. The directed position acquisition part 17 acquires the directed position from the carrier communication part 18. Further, the directed position acquisition part 17 outputs to the carrier control part 15 a signal showing the acquired directed position. The directed position directed from the controller 103 to the carrier 101 is, for example, a storing position corresponding to one placement part 125 in the rack 121 or 122, a position corresponding to the station 104, or some other position.

The carrier communication part 18 is a processing part that performs communication with the controller 103 and another carrier 101. The carrier communication part 18 receives a signal showing a directed position as a target position of the carrier 101 and the lift stage 112, or the like, from the controller 103 and receives a signal showing information of a position and the like of another carrier 101 from another carrier 101. Further, the carrier communication part 18 outputs a signal including information of a position and the like of the own vehicle to the controller 103 and another carrier 101.

1-4. Operation Outline for Carrier

Next, an operation outline for the carrier 101 according to the present embodiment will be described with reference to FIG. 5.

Figure 5:
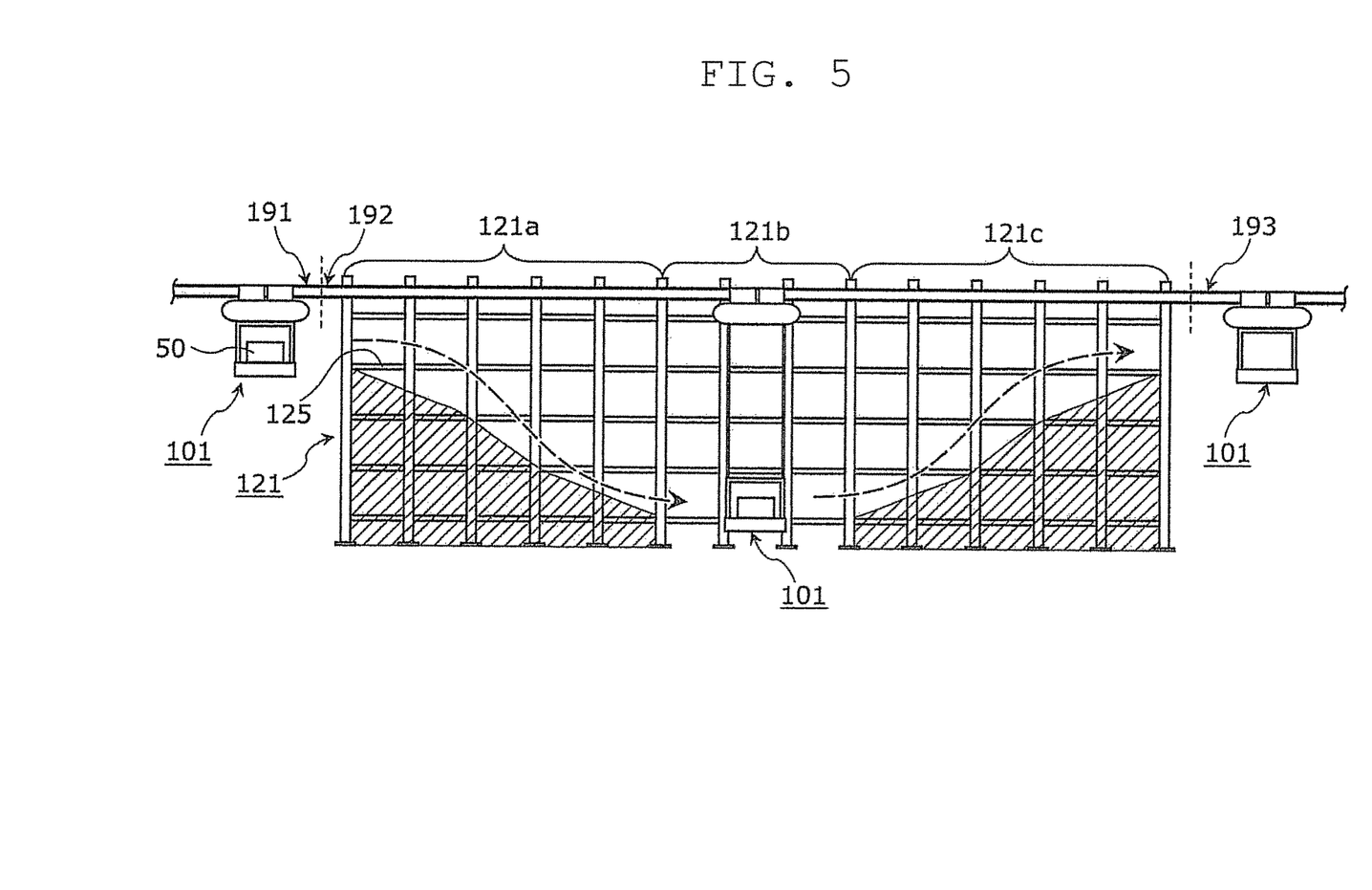
FIG. 5 is a view illustrating one example of an operation of the carrier according to the first embodiment.

FIG. 5 is a view illustrating one example of the operation of the carrier 101 according to the present embodiment.

FIG. 5 illustrates an operation in the case where the carrier 101 travels from the curved part 191 to the linear part 192 of the circulation rail 190, stores the cargo 50 in the rack 121, and thereafter travels to the curved part 193. In the example illustrated in FIG. 5, the carrier 101 stores the cargo 50 on the placement part 125 located at the lowest stage at the center of the rack 121 in the direction along the circulation rail 190. As illustrated in FIG. 5, in the present embodiment, in the curved parts 191 and 193 of the circulation rail 190, the carrier 101 travels while lifting the lift stage 112 to a position in the vicinity of the travelling vehicle 110 so as to suppress swinging of the lift stage 112 due to centrifugal force. Then when storing the cargo 50 on the placement part 125 that is the storing position of the rack 121 in the linear part 192 of the circulation rail 190, the carrier 101 travels while lowering the lift stage 112 as illustrated by a dotted arrow in FIG. 5. After storing the cargo 50 in the rack 121, the carrier 101 travels while lifting the lift stage 112, to bring the lift stage 112 into the state of being lifted to the position in the vicinity of the travelling vehicle 110 before reaching the curved part 193. Accordingly, at a point in time when the travelling vehicle 110 of the carrier 101 stops in the linear part 192 of the circulation rail, the lift stage 112 has been lowered to the storing position. Hence the carrier 101 can perform a storing operation immediately after stopping. Further, the travelling vehicle 110 can start travelling immediately after completing the storing operation. That is, it is possible to reduce the stop time required for the carrier 101 to store the cargo 50.

As described above, the carrier 101 according to the present embodiment comes into the state of lifting the lift stage 112 to the position in the vicinity of the travelling vehicle 110 during travelling along the curved parts 191 and 193 of the circulation rail 190. Therefore, in the vicinity of the end part of the curved part 191, there are limits on the height in which the lift stage 112 is lowered and is made to reach, while the carrier 101 travels. In the present embodiment, at a lower portion of an end part 121a that is a portion within a predetermined distance from the curved part 191 of the rack 121, there exists a region where the carrier 101 cannot lower the lift stage 112 while travelling. That is, in order to reach the region, it is necessary to lower the speed of the carrier 101, or stop the carrier 101 and then lower the lift stage 112. It can thus be said that the placement part 125 in the region is a placement part that requires longer time for storing and delivering the cargo 50 as compared with the case of storing and delivering the cargo 50 on the placement part 125 located at the highest stage of the rack 121. A meshed portion of the end part 121a of the rack 121 illustrated in FIG. 5 shows the region. Similarly, for example, after storing the cargo 50 on the placement part 125, the carrier 101 travels while lifting the lift stage 112, to bring the lift stage 112 into the state of being lifted to the position in the vicinity of the travelling vehicle 110 in the curved part 193. Therefore, when the carrier 101 stores the cargo 50 in the placement part 125 in the lower region of an end part 121c that is a portion within a predetermined distance from the curved part 193 of the rack 121, the carrier 101 cannot lift the lift stage 112 to the position in the vicinity of the travelling vehicle 110 before reaching the curved part 193. That is, in order to bring the lift stage 112 into the state of having been lifted before reaching the curved part 193 from that region, it is necessary to lower the speed of the carrier 101, or stop the carrier 101 and lift the lift stage 112. It can thus be said that the placement part 125 in the region is a placement part that requires longer time for storing and delivering the cargo 50 as compared with the case of storing and delivering the cargo 50 on the placement part 125 located at the highest stage of the rack 121. A meshed portion of the end part 121c of the rack 121 illustrated in FIG. 5 shows the region. Here, the placement part 125 included in the region of the meshed portion of the rack 121 illustrated in FIG. 5 is referred to as a non-priority placement part, and the placement part 125 other than that part in the rack 121 is referred to as a priority placement part. As illustrated in FIG. 5, the priority placement parts include a central part 121b of the rack 121 other than the end parts 121a and 121c, and a region above the end parts 121a and 121c. Although the rack 121 has been described above, the rack 122 is also divided into end parts and a central part in a similar manner. Further, the placement parts 125 provided in the rack 122 are also divided into priority placement parts and non-priority placement parts in a similar manner to the placement parts 125 in the rack 121.

In the present embodiment, in order to reduce the stop time of the carrier 101 during storing, the controller 103 preferentially selects the priority placement part as the storing position of the cargo 50 for the carrier 101. This reduces the stop time of the carrier 101 during storing, thus allowing rapid storing of the cargo 50 and suppressing disturbance of travelling of another carrier 101.

It is to be noted that the example has been shown in the present embodiment where the lift stage 112 is lifted or lowered in line in accordance with travelling of the travelling vehicle 110 such that the lift stage 112 draws a sinusoidal track in order to suppress swinging of the lift stage 112 in the vertical direction, but the mode of the operation of the lift stage 112 is not restricted to this. For example, the lift stage 112 may be lifted or lowered such that the lift stage 112 draws a linear track.

1-5. Operation of Carrier System

Next, an operation of the carrier system 100 according to the present embodiment will be described with reference to FIG. 6.

Figure 6:
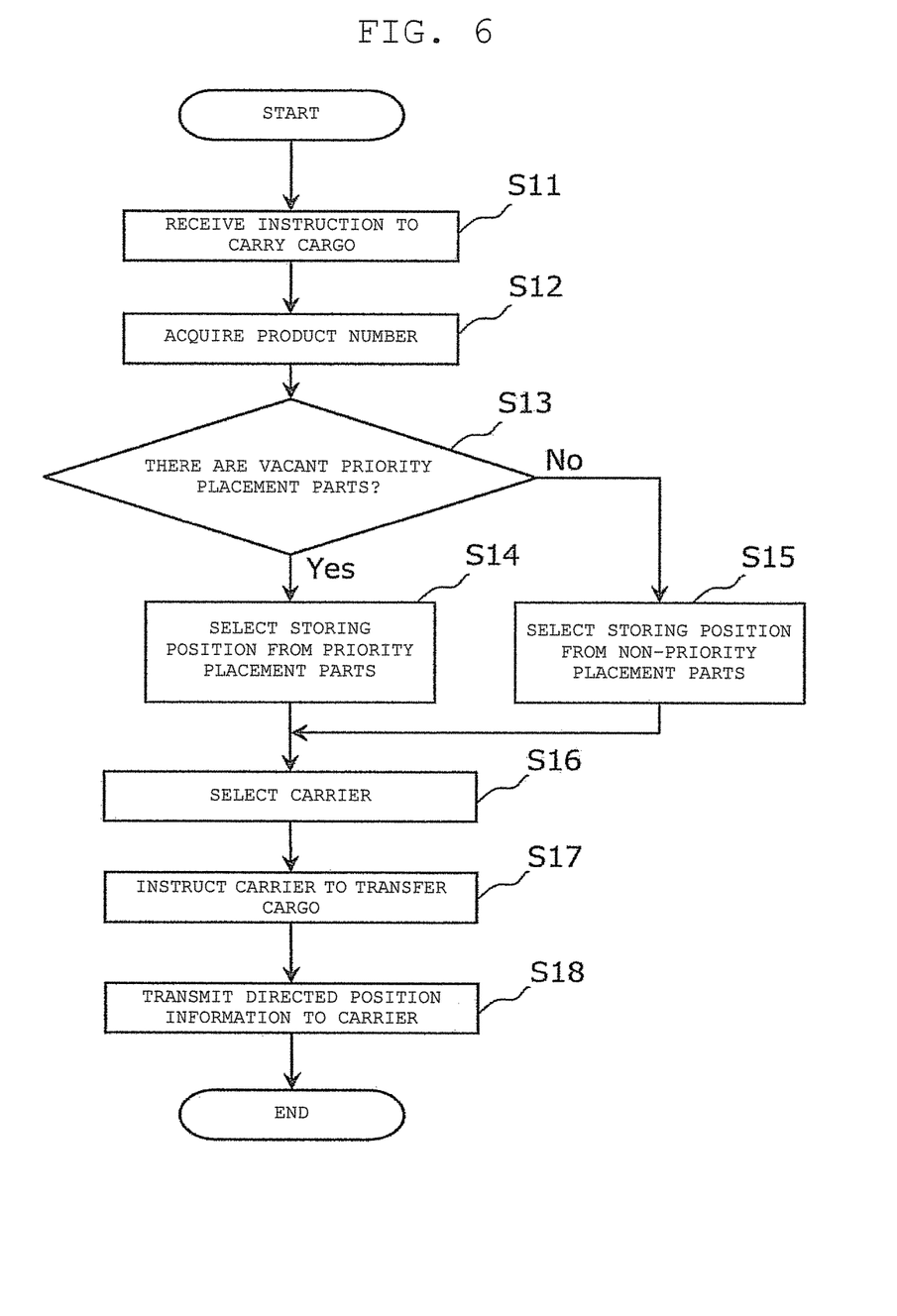
FIG. 6 is a flowchart illustrating an operation when storing a cargo in the carrier system according to the first embodiment.

FIG. 6 is a flowchart illustrating an operation at the time when storing the cargo 50 in the carrier system 100 according to the present embodiment. Here, as one example, an operation in the case where the user gives an instruction about storing of the cargo 50 from the station 104 to either the rack 121 or 122 is illustrated.

As illustrated in FIG. 6, first, the controller 103 receives an instruction to carry the cargo 50 from the user (S11).

Next, the controller 103 acquires a product number of the cargo 50 as an object to be carried (S12).

Next, the controller 103 acquires information of use conditions of the racks 121 and 122 from the memory 34, and determines whether there are vacant priority placement parts in the racks 121 and 122, namely, whether there exist priority placement parts having no other cargoes (S13). Then, when determining that there are vacant priority placement parts (Yes in S13), the controller 103 selects one of the vacant placement parts as the storing position of the cargo 50 (S14). On the other hand, when determining that there is no vacant priority placement part (No in S13), the controller 103 selects one of vacant non-priority placement parts as the storing position of the cargo 50 (S15). Here, at the time when selecting the storing position, the priority placement parts and the non-priority placement parts may further be divided, to decide the priority of the placement parts 125. For example, out of the priority placement parts, the placement part 125 for which the lowering amount of the lift stage 112 can be made small may be preferentially selected as the storing position. Further, out of the non-priority placement parts, the placement part 125, for which the required stop time of the carrier 101 at the time when transferring the cargo 50 can be made short, may be preferentially selected as the storing position.

Next, the controller 103 selects the carrier 101 for carrying the cargo 50 based on the selected storing position and a carrying condition of each carrier 101 stored in the memory 34 (S16). As the carrier 101 for carrying the cargo 50, for example, the carrier 101 that can reach the station 104 most early out of the carriers 101 not carrying other cargoes 50 is selected.

Next, the controller 103 makes the selected carrier 101 stop at the station 104, and instructs the carrier 101 to transfer the cargo 50 to the carrier 101 (S17). It is to be noted that the transfer of the cargo 50 to the carrier 101 may be performed by a transfer device in the station 104, or the like.

Next, the controller 103 transmits the selected storing position as a directed position to the carrier 101 where the cargo 50 has been transferred (S18). The carrier 101 having received the directed position moves to that directed position, and stores the cargo 50 on the placement part 125 as the storing position.

As described above, the controller 103 according to the present embodiment can preferentially store the cargo 50 on the priority placement part.

1-6. Effect, Etc.

As described above, the carrier system 100 according to the present embodiment includes the circulation rail 190 having the curved part, the plurality of carriers 101, the racks 121 and 122, and the controller 103 for instructing the plurality of carriers 101 about the storing position of the cargo 50. Here, each of the plurality of carriers 101 includes the travelling vehicle 110 that travels along the circulation rail 190 and the lift stage 112 liftably hung on the travelling vehicle 110 and configured to hold the cargo 50, and lifts or lowers the lift stage 112 while travelling along the circulation rail 190. Further, the racks 121 and 122 are arranged in parallel in the direction along the circulation rail 190, and each include the plurality of placement parts 125 arranged in parallel in the vertical direction. Further, the controller 103 selects any of the plurality of placement parts 125 as the storing position of the cargo 50, and instructs the carrier 101 that holds the cargo 50 out of the plurality of carriers 101, about the storing position.

Thereby, the carrier 101 according to the present embodiment can lift or lower the lift stage 112 while travelling, and hence the time for stopping to store the cargo 50 can be made shorter than that in the case of not lifting or lowering the lift stage 112 while travelling. This can reduce disturbance of travelling of another carrier 101 when the carrier 101 is at a stop to store the cargo 50. Hence the carrier system according to the present embodiment can rapidly carry a large number of cargoes 50. Further, in the carrier system 100 according to the present embodiment, the use of the circulation rail 190 including the curved part can lead to more improvement in layout flexibility than in a carrier system using a linear rail.

Further, in the carrier system 100 according to the present embodiment, each of the racks 121 and 122 includes the end part as a portion within a predetermined distance from the curved part of the circulation rail 190 and the central part other than the end part. Further, the end part includes the lower region located at a lower portion of the end part and the upper region located above the lower region. Further, when storing the cargo 50 in the rack 121 or 122, the controller 103 selects as the storing position the placement part 125 arranged in a region other than the lower region in preference to the placement part 125 arranged in the lower region, out of the plurality of placement parts 125.

Hence in the carrier system 100 according to the present embodiment, the carrier 101 lowers the lift stage 112 after passing through the curved part of the circulation rail 190, thereby lowering the lift stage 112 to the storing position or to a position in the vicinity of the storing position while travelling. Further, after completing storing of the cargo 50, the carrier 101 can lift the lift stage 112 to the position in the vicinity of the travelling vehicle 110 before reaching the curved part. Hence it is possible to further reduce the time when the carrier 101 stops to store the cargo 50.

Second Embodiment

Next, a carrier system according to a second embodiment will be described. In the carrier system 100 according to the first embodiment, the storing position of the cargo 50 has been preferentially selected from the priority placement parts. However, in the above first embodiment, since the frequency of storing and delivery (storing/delivery frequency) by the cargo 50 is not considered, for example, the cargo 50 with a low storing/delivery frequency may be placed on the priority placement part and the cargo 50 with a high storing/delivery frequency may be placed on the non-priority placement part. In this case, the cargo 50 with a high storing/delivery frequency located on the non-priority placement part is frequently stored and delivered, and in each time of the storing and delivery, the carrier 101 stops over a relatively long time. In the present embodiment, in order to suppress a harmful influence exerted by placement of the cargo 50 with a low storing/delivery frequency on the priority placement part as described above, the storing position is selected based on the storing/delivery frequency of the cargo 50. Hereinafter, a description will be mainly given of a functional configuration and an operation of a controller in the carrier system according to the present embodiment which are points of difference from the above first embodiment.

2-1. Functional Configuration of Controller

The functional configuration of the controller having a characteristic configuration of the present embodiment will be described with reference to FIG. 7.

Figure 7:
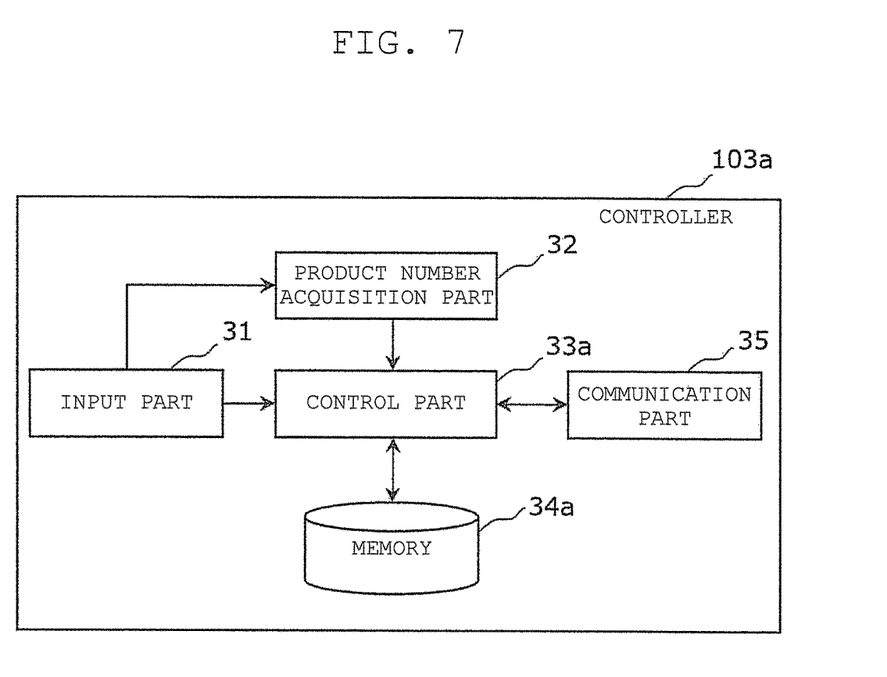
FIG. 7 is a block diagram illustrating a functional configuration of a controller according to a second embodiment.

FIG. 7 is a block diagram illustrating the functional configuration of the controller according to the present embodiment.

As illustrated in FIG. 7, similarly to the above first embodiment, a controller 103a according to the present embodiment includes the input part 31, the product number acquisition part 32, a control part 33a, a memory 34a, and the communication part 35. Functions of the input part 31, the product number acquisition part 32 and the communication part 35 of the controller 103a are similar to the functions of those according to the above first embodiment. On the other hand, functions of the control part 33a and the memory 34a of the controller 103a are partially different from the functions of the control part 33 and the memory 34 of the controller 103 according to the above first embodiment.

Similarly to the memory 34 according to the above first embodiment, the memory 34a is a memory that stores information of the configuration of the carrier system and the cargo 50 stored on each of the placement parts 125 in the racks 121 and 122. The memory 34a further includes a table showing the relation between the product number and the storing/delivery frequency of the cargo 50.

Similarly to the control part 33 according to the above first embodiment, the control part 33a is a processing part that decides an instruction concerning storing and delivery of the cargo 50 to the carrier 101. Further, at the time when selecting the storing position of the cargo 50, the control part 33a refers to a storing/delivery frequency of the cargo which is estimated from the product number of the cargo 50 acquired in the product number acquisition part 32. At this time, the control part 33a acquires from the memory 34a the storing/delivery frequency corresponding to the product number acquired in the product number acquisition part 32 based on the table showing the relation between the product number and the storing/delivery frequency, the relation being stored in the memory 34a. Then, the control part 33a selects the priority placement part as the storing position of the cargo 50 in the case where the storing/delivery frequency is larger than a predetermined frequency, and selects the non-priority placement part as the storing position of the cargo 50 in the case where the storing/delivery frequency is not larger than the predetermined frequency.

2-2. Operation of Carrier System

Next, an operation of a carrier system according to the present embodiment will be described with reference to FIG. 8.

Figure 8:
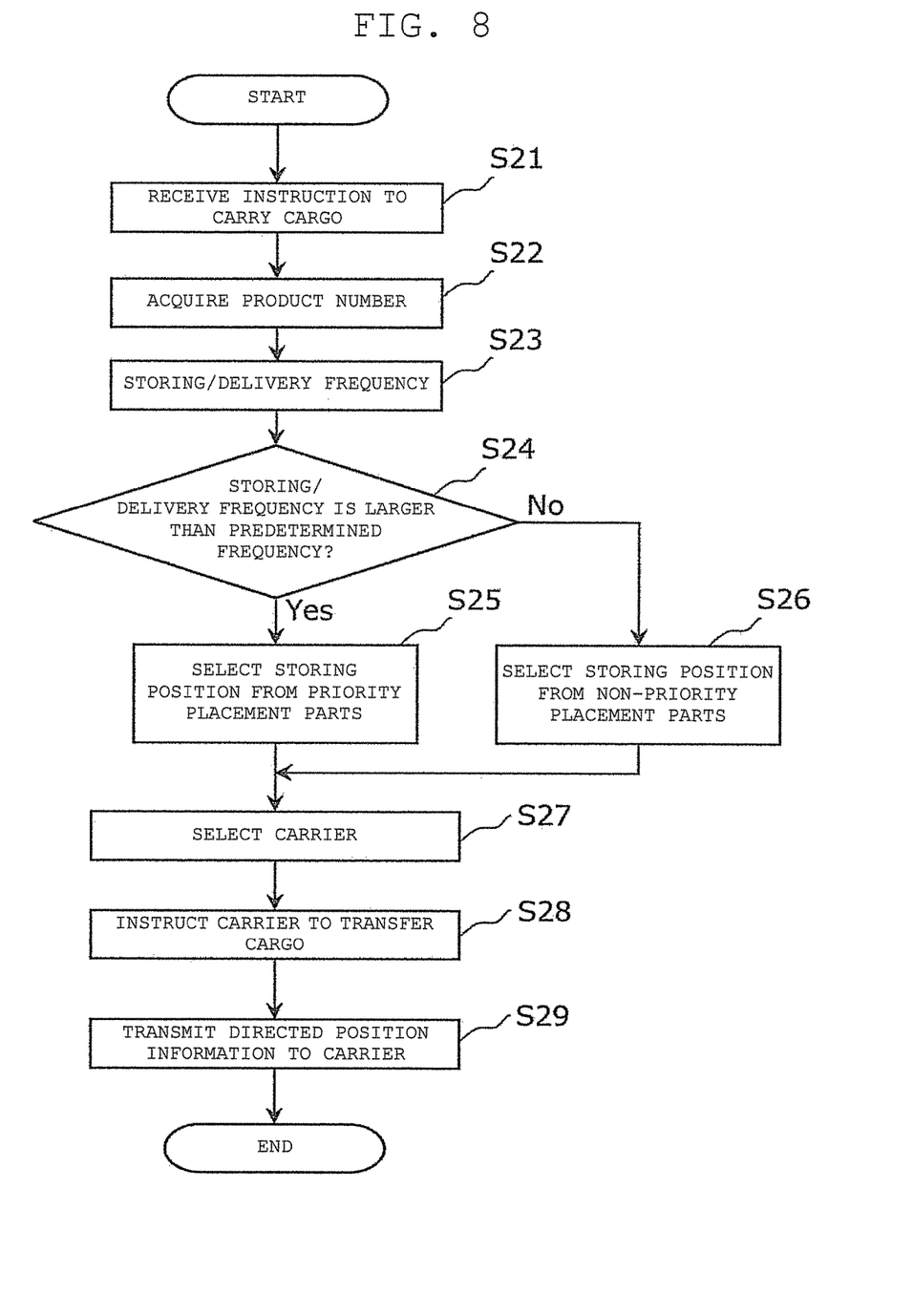
FIG. 8 is a flowchart illustrating an operation when storing a cargo in a carrier system according to the second embodiment.

FIG. 8 is a flowchart illustrating an operation at the time when storing the cargo 50 in the carrier system according to the present embodiment.

First, similarly to Steps S11 and S12 of the above first embodiment, also in the present embodiment, the input part 31 of the controller 103a receives an instruction to carry the cargo 50 from the user (S21), and the product number acquisition part 32 of the controller 103a acquires a product number of the cargo 50 (S22).

Next, the control part 33a of the controller 103a acquires from the memory 34a a storing/delivery frequency corresponding to the product number acquired in the product number acquisition part 32 (S23).

Next, the control part 33a of the controller 103 determines whether or not the storing/delivery frequency is larger than the predetermined frequency (S24). Here, when the storing/delivery frequency is larger than the predetermined frequency (Yes in S24), the control part 33a selects the priority placement part as the storing position of the cargo 50 (S25). On the other hand, when the storing/delivery frequency is not larger than the predetermined frequency (No in S24), the control part 33a selects the non-priority placement part as the storing position of the cargo 50 (S26). The predetermined frequency is appropriately decided in accordance with the storing/delivery frequency of each cargo 50, or the like. For example, the frequency of about twice per month may be employed as the predetermined frequency. In addition, similarly to the above first embodiment, also in Step S25 of the present embodiment, the storing position may be selected from the non-priority placement parts when there is no vacant priority placement part.

Steps S27, S28 and S29 illustrated in FIG. 8 which are subsequent to the above are respectively similar to Steps S16, S17 and S18 of the above first embodiment illustrated in FIG. 6.

2-3. Effect, Etc.

As described above, in the carrier system according to the present embodiment, the controller 103a acquires the storing/delivery frequency that is information showing the frequency of storing and delivery of the cargo 50 with respect to each cargo 50. The controller 103a selects the non-priority placement part as the storing position of the cargo 50 with a lower storing/delivery frequency than the predetermined frequency.

Hence in the carrier system according to the present embodiment, the cargo 50 with a low storing/delivery frequency is placed on the priority placement part, thereby reducing the possibility for the cargo with a high storing/delivery frequency to be arranged on the non-priority placement part. This reduces frequent storing and delivery of the cargo 50 with a high storing/delivery frequency which has been stored on the non-priority placement part, and stopping of the carrier 101 for a long time in each storing/delivery.

Third Embodiment

Next, a carrier system according to a third embodiment will be described. In each of the above embodiments, there has been employed the configuration where the travelling vehicle 110 is made to travel in the state where the lift stage 112 of the carrier 101 has been lifted to the position in the vicinity of the travelling vehicle 110 in the curved part of the circulation rail 190. In the present embodiment, there is employed a configuration where the lift stage 112 is not necessarily lifted to the position in the vicinity of the travelling vehicle 110 in the curved part of the circulation rail 190, and the speed of the travelling vehicle 110 is changed in accordance with the lowering amount of the lift stage 112. Hereinafter, a description will be mainly given of a functional configuration and an operation of a carrier in the carrier system according to the present embodiment which are points of difference from each of the above embodiments.

3-1. Functional Configuration of Carrier

Next, the functional configuration of the carrier according to the present embodiment will be described with reference to FIG. 9.

Figure 9:
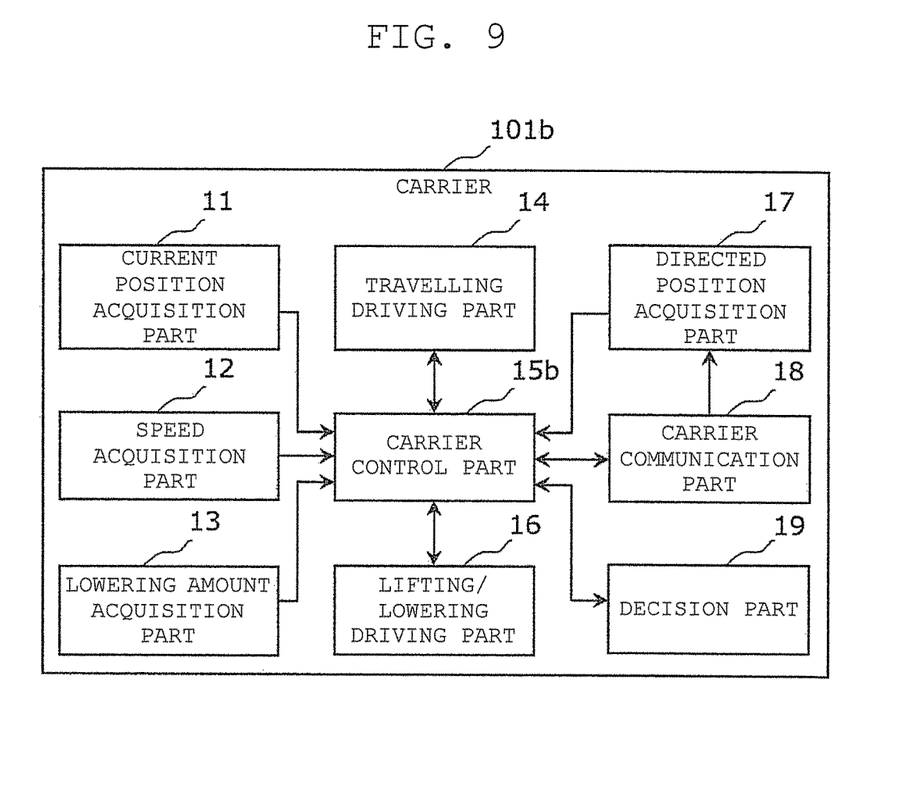
FIG. 9 is a block diagram illustrating a functional configuration of a carrier according to a third embodiment.

FIG. 9 is a block diagram illustrating a functional configuration of a carrier 101b according to the present embodiment.

As illustrated in FIG. 9, similarly to the carrier 101 according to each of the above embodiments, the carrier 101b according to the present embodiment includes the current position acquisition part 11, the speed acquisition part 12, the lowering amount acquisition part 13, the travelling driving part 14, a carrier control part 15b, a lifting/lowering driving part 16, the directed position acquisition part 17, and the carrier communication part 18. The carrier 101b according to the present embodiment further includes a decision part 19. Functions of the configurations other than the carrier control part 15b and the decision part 19 of the carrier 101b are similar to the functions of those according to each of the above embodiments. On the other hand, the function of the carrier control part 15b of the carrier 101b according to the present embodiment is partially different from the function of the carrier control part 15 according to each of the above embodiments. Hereinafter, a description will be given of the decision part 19 and the carrier control part 15b which are points of difference of the carrier 101b according to the present embodiment from the carrier 101 according to each of the above embodiments.

The decision part 19 is a processing part that decides the speed of the carrier 101b and the lowering amount of the lift stage 112 at the time when the carrier 101b travels in the curved part of the circulation rail 190. The decision part 19 decides the speed and the lowering amount of the lift stage 112 at the time when the carrier 101B travels in the curved part based on the position of the carrier 101b, the lowering amount of the lift stage 112, and the directed position at a point in time when the directed position acquisition part 17 acquires the directed position. It is to be noted that the decision part 19 receives information of the position of the carrier 101b and the like from the carrier control part 15b. Here, a description will be given of a method for deciding the speed and the lowering amount in the decision part 19. The decision part 19 decides the speed and the lowering amount such that the carrier 101b and the lift stage 112 reach the directed position in the minimum time, and that a width of swinging of the lift stage 112 due to centrifugal force is not larger than a predetermined value. For example, there is assumed a case where the cargo 50 is carried from the non-priority placement part in the end part 121c of the rack 121 illustrated in FIG. 5 to the non-priority placement part in the vicinity of the curved part 193 of the circulation rail 190 out of the placement parts 125 in the rack 122. In this case, when the carrier 101b travels while the lift stage 112 is held in a lower position in the curved part 193, it is possible to suppress the lifting/lowering amount of the lift stage 112 in the state where the carrier 101b is at a stop more than in the case where the carrier 101b travels in the curved part 193 after lifting the lift stage 112. However, in the case where the carrier 101b travels while the lift stage 112 is held in the lower position, the larger the lowering amount of the lift stage 112, the larger the width of swinging of the lift stage 112 due to centrifugal force becomes. Therefore, the carrier 101b suppresses the width of swinging of the lift stage 112 by making the speed of the carrier 101b lower when the lowering amount of the lift stage 112 is larger. That is, when the lowering amount of the lift stage 112 is a first lowering amount, the carrier 101b passes through the curved part at a first speed, and when the lowering amount of the lift stage 112 is a second lowering amount which is larger than the first lowering amount, the carrier 101b passes through the curved part at a second speed lower than the second speed. For example, the lowering amount of the lift stage 112 and the like are decided such that the width of swinging of the lift stage 112 is not larger than 0.1 m. Further, for example, the speed of the carrier 101b is decided to be a value inversely proportional to the lowering amount of the lift stage 112. The decision part 19 calculates and compares the time required before reaching the directed position between a case where the carrier 101b is made to travel at the speed and with the lowering amount decided as above and a case where the lowering amount of the lift stage 112 is decreased and the speed of the carrier 101b is increased. The decision part 19 then decides the speed and the lowering amount such that the above time becomes shorter.

Similarly to the carrier control part 15 of each of the above embodiments, the carrier control part 15b is a processing part for controlling the travelling driving part 14 and the lifting/lowering driving part 16. However, the carrier control part 15b of the present embodiment controls the lifting/lowering driving part 16 such that the lowering amount of the lift stage 112 at the time when the carrier 101b passes through the curved part of the circulation rail 190 is substantially equal to the lowering amount of the lift stage 112 decided by the decision part 19. Further, the carrier control part 15b controls the travelling driving part 14 such that the speed at the time when the carrier 101b passes through the curved part of the circulation rail 190 is substantially equal to the speed decided by the decision part 19.

3-2. Operation of Carrier

Next, an operation of the carrier 101b according to the present embodiment will be described with reference to FIG. 10.

Figure 10:
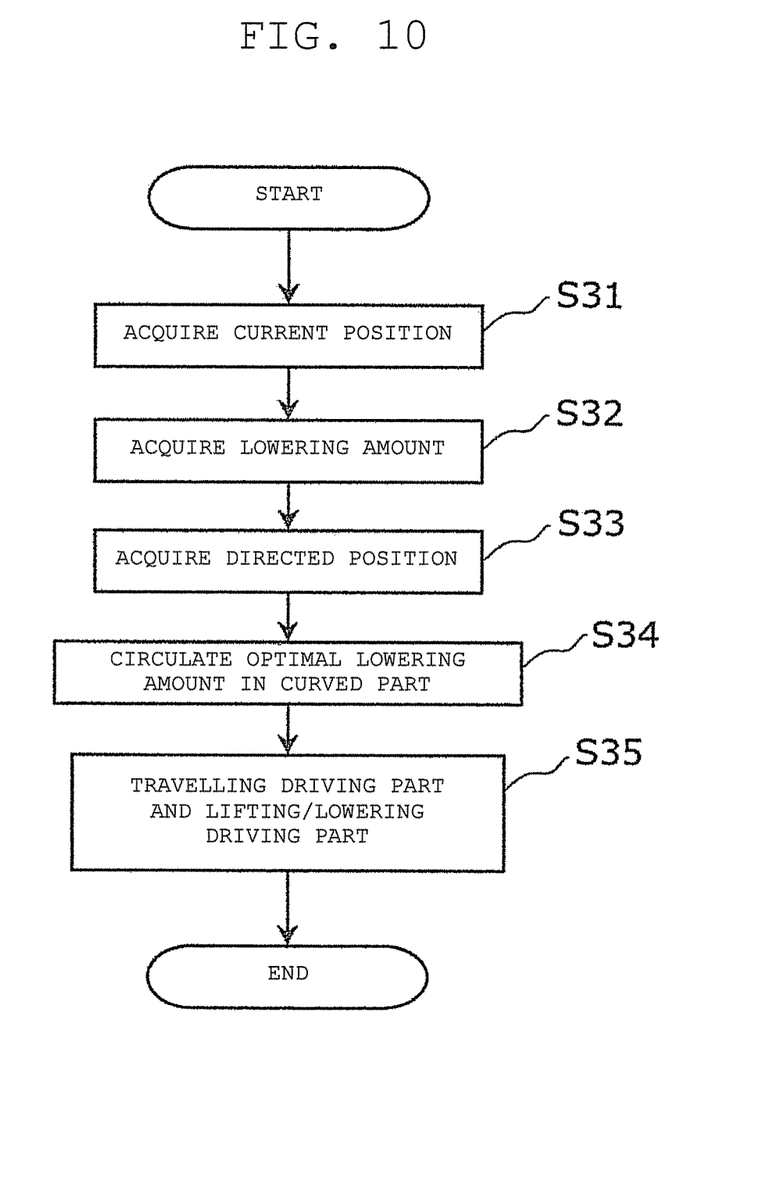
FIG. 10 is a flowchart illustrating an operation of the carrier according to the third embodiment.

FIG. 10 is a flowchart illustrating the operation of the carrier 101b according to the present embodiment.

As illustrated in FIG. 10, the current position acquisition part 11 of the carrier 101b acquires current position information (S31). The acquired current position information is inputted into the carrier control part 15b.

Next, the lowering amount acquisition part 13 of the carrier 101b acquires lowering amount information of the lift stage 112 (S32). The acquired lowering amount information is inputted into the carrier control part 15b.

Next, the directed position acquisition part 17 of the carrier 101b acquires directed position information instructed by the controller 103 (S33). The acquired directed position information is inputted into the carrier control part 15b.

Next, the decision part 19 of the carrier 101b acquires each pieces of information of the current position, the current lowering amount of the lift stage 112 and the directed position from the carrier control part 15b. Then, the decision part 19 calculates an optimal lowering amount of the lift stage 112 in the curved part of the circulation rail 190 based on each piece of the information such that the directed position is reached in the minimum time (S34). Further, the decision part 19 calculates the speed of the carrier 101b on the circulation rail 190 in accordance with the lowering amount.

Next, the carrier control part 15b controls the travelling driving part 14 and the lifting/lowering driving part 16 based on the lowering amount and the speed decided by the decision part 19 (S35). That is, the carrier control part 15b controls the lifting/lowering driving part 16 such that the lowering amount of the lift stage 112 in the curved part of the circulation rail 190 is substantially equal to the lowering amount decided by the decision part 19. Further, the carrier control part 15b controls the travelling driving part 14 such that the speed of the carrier 101b in the curved part of the circulation rail 190 is substantially equal to the speed decided by the decision part 19.

3-3. Effect, Etc.

As described above, in the carrier system according to the present embodiment, the carrier 101b passes through the curved part of the circulation rail 190 at the first speed when the lowering amount of the lift stage 112 is the first lowering amount. On the other hand, the carrier 101b passes through the curved part at the second speed which is lower than the first speed when the lowering amount of the lift stage 112 is the second lowering amount which is larger than the first lowering amount.

Hence in the carrier system according to the present embodiment, it is possible to suppress a width of swinging of the lift stage 112 due to centrifugal force in the case where the carrier 101b travels in the curved part of the circulation rail 190.

Further, in the carrier system according to the present embodiment, the carrier 101b further includes the decision part 19 that decides the lowering amount of the lift stage 112 at the time when the carrier 101b passes through the curved part. Here, the decision part 19 decides the lowering amount of the lift stage 112 at the time when the carrier 101b passes through the curved part based on the storing position, and on the position of the carrier 101b and the lowering amount of the lift stage 112 at a point in time when the storing position is instructed by the controller 103.

Accordingly, the decision part 19 of the carrier 101b can appropriately decide the lowering amount of the lift stage 112 at the time when the carrier 101b passes through the curved part in accordance with the storing position of the cargo 50, and the like. For example, the decision part 19 can decide the lowering amount of the lift stage 112 such that the carrier 101b can move to the storing position in the minimum time. Moreover, the decision part 19 can decide the speed of the carrier 101b at the time when the carrier 101b passes through the curved part in accordance with the lowering amount.

Modified Example, Etc.

In the above, the carrier system and the method for controlling the same according to the present invention have been described based on the embodiments. However, the present invention is not restricted to each of the above embodiments. For example, another embodiment realized by arbitrarily combining the constituents described in the present specification or excluding some of the constituents may be taken as an embodiment of the present invention.

Further, a modified example, obtained by making a variety of transformation on the above embodiment and conceived by a person skilled in the field, is included in the present invention in a range not deviating from the gist of the present invention, namely the meaning shown by wording recited in the claims.

For example, although only the racks 121 and 122 are provided in the carrier system according to each of the above embodiments, the number of racks may be three or larger.

Further, although the description has been given in each of the above embodiments by mainly taking as the example the operation of storing the cargo 50 from the station 104 in the rack 121 or 122, the operation of the present invention is not restricted to this. For example, the carrier system of the present invention can similarly perform an operation of moving the cargo 50 from the placement part 125 in the rack 121 or 122 to another placement part 125, or some other operation.

Moreover, although the decision part 19 has been provided in the carrier 101b in the above third embodiment, as a configuration where the decision part 19 is provided in the controller 103, a signal showing the lowering amount and the speed may be transmitted from the controller 103 to the carrier 101b.

Furthermore, in the above third embodiment, the decision part 19 decides the speed and the lowering amount such that the carrier 101b and the lift stage 112 reach the directed position in the minimum time, and that the width of swinging of the lift stage 112 due to centrifugal force is not larger than the predetermined value. However, the carrier system of the present invention is not restricted to this. That is, the speed and lowering amount are not necessarily restricted to such values that the directed position is reached in the minimum time. The speed and the lowering amount may be such a speed and a lowering amount that the directed position is reached in the time not longer than the time required for reaching the directed position in the case where the lowering amount of the lift stage 112 is zero in the curved part of the circulation rail 190.

The present invention is applicable to a ceiling carrier that travels along a route arranged on a ceiling and carries a cargo from one place to the other, a carrier system including that ceiling carrier, and the like.

What is claimed is:

1. A carrier system comprising:
    a circulation rail which is hung from above and includes a curved part;
    a plurality of carriers, each of which 1) includes a travelling vehicle that travels along the circulation rail and a lift stage that is liftably hung on the travelling vehicle, 2) hold a cargo, and 3) freely lifts and lowers the lift stage to and from a storing position while simultaneously traveling along the circulation rail;
    a plurality of racks which are arranged in parallel along the circulation rail, and each of which includes a plurality of placement parts arranged in parallel in a vertical direction; and
    a controller which selects any of the plurality of placement parts as the storing position of the cargo and instructs the carrier that holds the cargo out of the plurality of carriers, about the storing position.

2. The carrier system according to claim 1, wherein
    each of the plurality of racks includes an end part that is a portion within a predetermined distance from the curved part, and a central part other than the end part,
    the end part includes a lower region located at a lower portion of the end part and an upper region located above the lower region, and
    when storing the cargo in the plurality of racks, the controller selects, as the storing position, the placement part arranged in a region other than the lower region in preference to the placement part arranged in the lower region, out of the plurality of placement parts.

3. The carrier system according to claim 2, wherein the controller acquires a storing/delivery frequency showing a frequency of storing and delivering the cargo with respect to each of the cargoes, and selects the placement part arranged in the lower region as the storing position of the cargo with a storing/delivery frequency lower than a predetermined frequency.

4. The carrier system according to claim 1, wherein the carrier passes through the curved part at a first speed when a lowering amount of the lift stage is a first lowering amount, and the carrier passes through the curved part at a second speed which is lower than the first speed when the lowering amount of the lift stage is a second lowering amount which is larger than the first lowering amount.

5. The carrier system according to claim 1, wherein at least one of the controller and the carrier further includes a decision part which decides a lowering amount of the lift stage at a time when the carrier passes through the curved part based on the storing position, and on the position of the carrier and the lowering amount of the lift stage at a point in time when the storing position is instructed by the controller.

* * * * *